(12) United States Patent
Calabrese et al.

(10) Patent No.: US 11,209,540 B2
(45) Date of Patent: Dec. 28, 2021

(54) SAR IMAGING METHOD FOR INTERFEROMETRIC ANALYSES

(71) Applicant: Thales Alenia Space Italia S.p.A. Con Unico Socio, Rome (IT)

(72) Inventors: Diego Calabrese, Rome (IT); Fabrizio Impagnatiello, Rome (IT)

(73) Assignee: Thales Alenia Space Italia S.p.A. Con Unico Socio, Rome (IT)

(*) Notice: Subject to any disclaimer, the term of this patent is extended or adjusted under 35 U.S.C. 154(b) by 297 days.

(21) Appl. No.: 16/309,061

(22) PCT Filed: Jun. 21, 2017

(86) PCT No.: PCT/IB2017/053689
§ 371 (c)(1),
(2) Date: Dec. 11, 2018

(87) PCT Pub. No.: WO2017/221166
PCT Pub. Date: Dec. 28, 2017

(65) Prior Publication Data
US 2019/0196005 A1 Jun. 27, 2019

(30) Foreign Application Priority Data
Jun. 21, 2016 (IT) .................. 102016000064085

(51) Int. Cl.
*G01S 13/90* (2006.01)
*G01S 7/40* (2006.01)
*G01S 7/04* (2006.01)

(52) U.S. Cl.
CPC ............ *G01S 13/9023* (2013.01); *G01S 7/04* (2013.01); *G01S 7/4021* (2013.01);
(Continued)

(58) Field of Classification Search
CPC .. G01S 13/9023; G01S 2007/403; G01S 7/04; G01S 7/4021; G01S 7/4026
See application file for complete search history.

(56) References Cited

U.S. PATENT DOCUMENTS

2016/0109570 A1* 4/2016 Calabrese .............. G01S 13/90
342/25 F
2017/0299715 A1* 10/2017 Tsuchida .............. G01S 13/282

OTHER PUBLICATIONS

Shimada, A New Method for Correcting ScanSAR Scalloping Using Forests and Inter-SCAN Banding Employing Dynamic Filtering, IEEE Transactions on Geoscience and Remote Sensing, IEEE Service Center, vol. 47, No. 12, Dec. 2009, pp. 3933-3942.
(Continued)

*Primary Examiner* — Timothy A Brainard
(74) *Attorney, Agent, or Firm* — McCarter & English, LLP

(57) ABSTRACT

A SAR imaging method for interferometric analyses is provided, including: receiving raw SAR data related to two or more SAR acquisitions of one and the same area of the earth's surface carried out by one or more synthetic aperture radars; and processing the raw SAR data to generate SAR images. For each SAR acquisition, the respective raw SAR data is processed based on two different sets of processing parameters: a first set that is the same for all the SAR acquisitions and which comprises focusing Doppler parameters computed based on physical Doppler parameters related to all the SAR acquisitions; and a second set which comprises respective radiometric equalization Doppler parameters related to the SAR acquisition and computed based on respective physical Doppler parameters related to the SAR acquisition. Processing includes: focusing the raw SAR data related to all SAR acquisitions based on the focusing Doppler parameters and, for each SAR acquisition, applying a respective radiometric equalization, based on the
(Continued)

respective radiometric equalization Doppler parameters, to the respective SAR data to compensate for possible differences in pointing of the synthetic aperture radar(s), without degrading azimuth resolution and without introducing radiometric distortions.

10 Claims, 12 Drawing Sheets

(52) U.S. Cl.
CPC ............ *G01S 7/4026* (2013.01); *G01S 7/403* (2021.05); *G01S 13/9054* (2019.05); *G01S 13/9056* (2019.05)

(56) References Cited

OTHER PUBLICATIONS

Meta, et al., TOPS Imaging with TerraSAR-X: Mode Design and Performance Analysis, IEEE Transactions on Geoscience and Remote Sensing, IEEE Service Center, vol. 48, No. 2, Feb. 2010, pp. 759-769.
Monti-Guarniere, et al., Optimal Focusing for Low Resolution ScanSAR, IEEE Transactions on Geoscience and Remote Sensing, IEEE Service Center, vol. 39, No. 3, Mar. 2001, pp. 479-491.
PCT International Search Report and Written Opinion for PCT/IB2017/053689 dated Nov. 9, 2017.

* cited by examiner

SAR IMAGING METHOD FOR INTERFEROMETRIC ANALYSES

CROSS-REFERENCE TO RELATED APPLICATIONS

This application is a 35 U.S.C. § 371 National Stage filing of International Application No. PCT/IB2017/053689, filed on Jun. 21, 2017, which claims priority to Italian Patent Application 102016000064085, filed on Jun. 21, 2016.

TECHNICAL FIELD OF INVENTION

The present invention relates, in general, to remote sensing by means of synthetic aperture radar (SAR) and, in particular, to SAR-based interferometry.

More specifically, the present invention concerns a technique for generating SAR images for interferometric analyses. The present invention finds advantageous, although not exclusive, application in the processing of raw SAR data related to two or more SAR acquisitions performed in burst mode.

STATE OF THE ART

As is known, one of the most widespread applications in the world of SAR systems is interferometry, with its different solutions that range from estimating a digital elevation model (DEM) for an area of interest, to estimating the height variation of targets (differential interferometry) and detecting changes in two scenes (coherent change detection).

The main mode of SAR acquisition for interferometry is the so-called Stripmap, because the acquisition characteristics and, in particular, the azimuth angle parameters are substantially invariant for targets arranged along the azimuth. Although, with a little more complexity, other operating modes (in particular Spotlight, ScanSAR, PingPong and TOPS) can also be used for interferometric applications.

A typical reference geometry for generating SAR images of the earth's surface is shown in FIG. 1. With regard to this, it is wished to underline the fact that in FIG. 1 (and also in the following figures that will be presented and described hereinafter), the earth's surface is (and will be) shown "flat" only for convenience and simplicity of illustration and description, without any loss of generality.

In particular, FIG. 1 schematically shows a synthetic aperture radar 10 (hereinafter called a SAR sensor, for simplicity of description) that moves along a flight direction d at an altitude h (with respect to the earth's surface) assumed to be substantially constant. As is known, the altitude h of the SAR sensor 10 is measured along a nadir direction z that passes through said SAR sensor 10 (in particular it passes through the phase centre of the antenna of the SAR sensor 10) and is orthogonal to the earth's surface and the flight direction d. Conveniently, the SAR sensor 10 is transported in flight/orbit by an aerial/space platform (not shown in FIG. 1 for simplicity of illustration) such as, for example, a plane, an unmanned aerial vehicle (UAV) or a satellite. The ground track of the flight direction d identifies an azimuth direction x that is parallel to said flight direction d and orthogonal to the nadir direction z, while a cross-track direction y, which is orthogonal to both the nadir direction z and the azimuth direction x, together with the azimuth direction x, identifies an x-y plane tangential to the earth's surface. In use, by means of an opportune antenna (not shown in FIG. 1 for simplicity of illustration), the SAR sensor 10 transmits radar pulses and receives the associated back-scattered signals in an acquisition direction sr that identifies the slant range and which forms an elevation angle θ to the nadir direction z and a squint angle φ to the flight direction d (or, equivalently, to the azimuth direction x) that, in the SAR acquisition geometry shown in FIG. 1, is equal to (approximately) 90° (so-called "almost-zero-Doppler" geometry).

In particular, in the stripmap type of SAR acquisition geometry shown in FIG. 1, the SAR sensor 10 illuminates a strip of the earth's surface, known as a swath, with radar pulses and then receives the associated back-scattered signals from the swath, which mainly extends parallel to the azimuth direction x and which has a given width W along the cross-track direction y. For greater clarity, FIG. 2 shows the geometry of SAR acquisition in stripmap mode in the x-y plane, where it is possible to observe how the squint angles φ are all the same; in particular, in the example shown in FIG. 2, the squint angles φ are all right angles ("almost-zero-Doppler" geometry).

Moreover, FIG. 3 schematically shows, from a radiometric standpoint, how a target (indicated by reference numeral 11) positioned on the earth's surface is illuminated, in stripmap mode, by the antenna beam (indicated by reference numeral 12) of the SAR sensor 10. In particular, as shown in FIG. 3 (where reference is made to the x-z plane of the previously introduced xyz Cartesian reference system, already used in FIGS. 1 and 2), the target 11 is illuminated by the entire antenna beam 12. More generally, each point of the image along the azimuth direction x is illuminated with the same beam portions, i.e. it receives the same power; as a consequence, the so-called "scalloping" effect is not present in stripmap mode.

In addition, FIG. 3 also shows the radiometric correction (indicated by reference numeral 13) applied/applicable to the signal related to the target 11 (even if this radiometric correction is not strictly necessary in stripmap mode because, as just explained, all the points are illuminated, along the azimuth direction x, with the same beam portions).

As is known, the azimuth resolution for a SAR acquisition in stripmap mode is a function of the angular aperture (or angular difference–delta angle) with which a target is observed by the SAR sensor; or, in an equivalent manner, the azimuth resolution can be also seen as a function of the time difference (delta time), linked to the velocity of the SAR sensor, with which the target is observed. In particular, the azimuth resolution can be expressed by the following equation (for further details, reference can be made, for example, to G. Franceschetti and R. Lanari, "*Synthetic Aperture RADAR Processing*", CRC Press, March 1999):

$$res_{Strip} = \frac{0.886\lambda}{2 * \text{delta\_angle}},$$

where $res_{Strip}$ indicates the stripmap azimuth resolution, λ indicates the wavelength used by the SAR sensor and delta_angle indicates the angular aperture (or angular difference–delta angle) with which the target is observed by the SAR sensor.

Assuming the angle as a 3 dB aperture (one-way) of the antenna (=0.886λ/L, where L indicates the physical or equivalent length along the azimuth direction of the antenna of the SAR sensor), the constraint traditionally associated with the azimuth resolution for the stripmap mode can be obtained, which is equal to L/2 (for further details, please refer again to "*Synthetic Aperture RADAR Processing*").

Currently, very wide antenna beams are used to improve the azimuth resolution, these being achieved through the use of antennas of small size or under-illuminated or with amplitude and/or phase modulation such as to reduce the equivalent size, or by using the so-called spotlight mode, the acquisition logic of which is schematically illustrated in FIG. 4.

In particular, as shown in FIG. 4 (where reference is made to the x-y plane of the previously introduced xyz Cartesian reference system, already used in FIGS. 1-3), the SAR acquisition logic in spotlight mode envisages using a continuous, or quasi-continuous, steering of the antenna beam during the flight movement of the SAR sensor 10 (by dynamically adjusting the value of the squint angle φ) so as to always illuminate a same area of interest with the radar pulses and then receive the associated back-scattered signals therefrom, in this way increasing the persistence time of the SAR sensor 10 on said area of interest and thus improving the azimuth resolution.

Both of the aforementioned methodologies used for improving the azimuth resolution suffer from some drawbacks. In particular, the use of very wide antenna beams requires using very high transmission powers, while the spotlight mode introduces limitations on the azimuth length of the swaths.

One solution to the aforementioned drawbacks is provided by International Patent Application WO 2014/122624 A1, which concerns a method for generating SAR images that comprises performing N SAR acquisitions in stripmap mode of areas of the earth's surface by means of a synthetic aperture radar that is transported by an aerial or satellite platform and which comprises a single, non-partitioned antenna and a single receiver coupled to said single, non-partitioned antenna, where N is an integer greater than one.

In particular, according to WO 2014/122624 A1, all N SAR acquisitions in stripmap mode are performed using a same predetermined elevation angle with respect to the nadir of the synthetic aperture radar in such a way that said N SAR acquisitions in stripmap mode all regard a same specific swath of the earth's surface. Instead, each SAR acquisition in stripmap mode is performed using a respective squint angle with respect to the flight direction of the synthetic aperture radar, said respective squint angle being different from the squint angle used to perform the other N-1 SAR acquisitions in stripmap mode.

Furthermore, according to WO 2014/122624 A1, each SAR acquisition performed in stripmap mode comprises respective radar transmission and reception operations that:
  are time interleaved, individually or in groups, with single, or groups of, radar transmission and reception operations of the other N-1 SAR acquisitions performed in stripmap mode; and
  comprise the transmission and reception of respective radar beams in respective acquisition directions that are defined by the predetermined elevation angle and by the respective squint angle used for said SAR acquisition in stripmap mode, thereby resulting in that said respective acquisition directions are parallel to each other and not parallel to the acquisition directions of the other N-1 SAR acquisitions performed in stripmap mode.

Furthermore, according to WO 2014/122624 A1, the radar beams transmitted and received in two radar transmission and reception operations performed in two immediately successive moments in time and related to two different SAR acquisitions in stripmap mode are contiguous along the azimuth, in this way increasing the integration times with respect to those obtainable via any single one of the N SAR acquisitions performed in stripmap mode.

Finally, the method according to WO 2014/122624 A1 also comprises generating SAR imaging of areas of the specific swath on the basis of all the N SAR acquisitions performed in stripmap mode, said SAR images having an azimuth resolution that is enhanced by a factor of up to N with respect to a nominal stripmap azimuth resolution, which is equal to half the physical or equivalent length along the azimuth direction of the single, non-partitioned antenna of the synthetic aperture radar.

As is known, in order to exploit the capabilities of a SAR system to the maximum, in addition to the stripmap and spotlight modes, various other techniques have been proposed over the years for using SAR sensors, including the so-called burst modes.

In particular, the burst modes are based on the concept of time division, i.e. the SAR acquisition is divided into separate time blocks (so-called "bursts") that, opportunely aggregated, enable observing:
  several subswaths, in this way increasing the observed surface (ScanSAR mode); or
  a same area using different electromagnetic characteristics, for example, using different polarizations (PingPong mode).

The main burst mode is the ScanSAR mode, which divides time into synchronous bursts (i.e. with a regular rate). A scene portion at the antenna's nominal pulse repetition frequency (PRF) is acquired in each burst, in such a way that the azimuth spectrum is correctly sampled, but for a shorter time (and therefore a smaller delta angle). This time division enables switching the beam, in subsequent bursts, in other directions in order to increase the swath in range. In practice, the "azimuth time" is divided into $N_b$ bursts and a different subswath is acquired at each burst. The greatest contraindication of this mode is that by reducing the delta angle, the azimuth resolution deteriorates.

In particular, in order to ensure that the acquisitions do not have gaps in the azimuth (i.e. in order to ensure continuous azimuth coverage, or the absence of "holes"), the maximum acquisition time, and therefore the resolution, must satisfy the following relation:

$$T_{ScanSar} < \frac{T_{Strip}}{N_B + 1} \rightarrow res_{ScanSar} > (N_b + 1) res_{Strip}$$

where $T_{ScanSar}$ indicates the maximum ScanSAR acquisition time, $T_{Strip}$ indicates the maximum Stripmap acquisition time, $res_{ScanSar}$ indicates the ScanSAR resolution, $res_{Strip}$ indicates the Stripmap reference resolution (i.e. L/2) and $N_b$ indicates, as previously mentioned, the number of bursts in which each acquisition cycle is subdivided, i.e. the number of subswaths observed (for further details, please refer again to "*Synthetic Aperture RADAR Processing*", pages 225-229).

With regard to this, FIG. 5 schematically shows an example of SAR acquisition logic in ScanSAR mode. In particular, as shown in FIG. 5 (where reference is made to the previously introduced x-z plane of the xyz Cartesian reference system, already used in FIGS. 1-4), a SAR sensor (not shown in FIG. 5 for simplicity of illustration), during movement along the flight direction d, performs a series of acquisition cycles $C_i$ (where i=1, 2, 3, . . . ) in succession, each of which is divided into three bursts $B_1^i$, $B_2^i$, $B_3^i$ (i.e. $N_b$=3 in the example in FIG. 5). In detail, in the first burst $B_1^i$ of each acquisition cycle $C_i$ the SAR sensor acquires (or observes) a first subswath, in the second burst $B_2^i$ of each acquisition cycle $C_i$ the SAR sensor acquires (or observes) a second subswath, and in third burst $B_3^i$ of each acquisition cycle $C_i$ the SAR sensor acquires (or observes) a third subswath. Obviously, acquisitions of a same subswath must be performed so as to ensure acquisition continuity along the azimuth direction x.

Therefore, in the ScanSAR mode, each target is illuminated for a shorter time period with respect to what happens in stripmap mode. Furthermore, always with respect to the stripmap mode, in the ScanSAR mode each target is illuminated by a different portion of the antenna beam. With regard to this, FIG. 6 schematically shows, from a radiometric standpoint, how three targets (indicated as $P_1$, $P_2$ and $P_3$, respectively), having different azimuth positions and located in the portion of the first subswath observed in the first burst $B_1^2$ of the second acquisition cycle $C_2$ in the example of ScanSAR acquisition in FIG. 5, are illuminated. In detail, in FIG. 6, the respective illuminating antenna beam for each of the three targets $P_1$, $P_2$ and $P_3$, is indicated by reference numerals 14, and 16, respectively. As shown in FIG. 6, the various points of each imaging burst are illuminated by different beam portions (i.e. the illuminating power varies along the azimuth).

In consequence, there is scalloping in ScanSAR mode. In fact, since each portion of surface is illuminated by a different portion of the antenna beam along the azimuth, it is necessary to equalize the antenna pattern in the processing phase in order to obtain correct radiometric values. To perform this equalization, it is necessary to know the steering of the antenna; in the event of errors in the knowledge/estimate of antenna steering, radiometric artefacts known as the scalloping effect are created.

With regard to this, FIG. 7 shows the example of ScanSAR acquisition in FIG. 5 again, together with a graph representing the residual radiometric error in the first bursts $B_1^1$ and $B_1^2$ of the first and second acquisition cycle $C_1$ and $C_2$; in particular, the radiometric jump between said bursts $B_1^1$ and $B_1^2$ that causes scalloping is quite evident in FIG. 7.

In addition, FIG. 8 again show the antenna beams 14, 15 and 16 that illuminate the targets $P_1$, $P_2$ and $P_3$ (shown in FIG. 6) positioned in the portion of the first subswath observed in the first burst $B_1^2$ of the second acquisition cycle $C_2$ in the example of ScanSAR acquisition in FIG. 5. FIG. 8 also shows the respective radiometric corrections (for each of the three targets $P_1$, $P_2$ and $P_3$, the respective radiometric correction being indicated by reference numerals 17, 18 and 19, respectively), together with the respective radiometric error.

For further details regarding the ScanSAR mode, reference can be made, for example, to Andrea Monti-Guarnieri and Pietro Guccione, "*Optimal "focusing" for low resolution ScanSAR*", IEEE Transactions on Geoscience and Remote Sensing, Vol. 39, No. 3, 1 Mar. 2001, XP011021705, ISSN: 0196-2892. This article deals with the focusing of low-resolution ScanSAR data, for both detected amplitude images and interferometric applications. In particular, as described in the abstract of this article, the conventional ScanSAR focusing techniques provide quite effective compensation of the azimuth antenna pattern (e.g. no scalloping) when the so-called azimuth time-bandwidth product of the ScanSAR echo is large, but fail to perform compensation when the bursts are of very short duration (in this case, it is reduced to an ineffective weighting of the output). The result is an azimuth varying distortion of the focused impulse responses, a distortion that is partly compensated for in the multilook average (not available for interferometric applications) at the price of a reduction in the processed Doppler bandwidth.

Instead, the above-mentioned "*Optimal "focusing" for low resolution ScanSAR*" article proposes an approach in which a set of short kernels is used, each suitable for focusing at a specific azimuth value. These kernels are optimized to reconstruct reflectivity with a minimum mean square error. The pseudo-inversion converges to the "conventional" focusing for wide and short bursts. These azimuth-varying kernels can be suitably tuned to meet constraints in the resolution/sidelobes trade-off and enable better exploitation of the available Doppler bandwidth.

In other words, the above-mentioned "*Optimal "focusing" for low resolution ScanSAR*" article describes an approach for processing acquisitions in ScanSAR mode with a short azimuth time-bandwidth product without increasing impulse response distortion, demonstrating the validity of the algorithm also for interferometric application. With regard to this, it is important to note that in said "*Optimal "focusing" for low resolution ScanSAR*" article, it is assumed that a zero Doppler geometry will always be used, in which each acquisition is focused using a single set of processing parameters that includes a respective Doppler rate, while the Doppler centroid is assumed to be zero for all acquisitions in virtue of the geometry used (i.e. a zero Doppler geometry).

The burst modes also include the TOPS mode, which uses varying azimuth antenna steering (for further details, reference can be made, for example, to F. De Zan and A. Monti Guarnieri, "*TOPSAR: Terrain Observation by Progressive Scans*", IEEE Transactions on Geoscience and Remote Sensing, Vol. 44, No. 9, September 2006, pages 2352-2360, and also to Adriano Meta et al., "*TOPS Imaging With TerraSAR-X: Mode Design and Performance Analysis*", IEEE Transactions on Geoscience and Remote Sensing, Vol. 48, No. 2, 1 Feb. 2010, pages 759-769, XP011296215, ISSN: 0196-2892). In particular, in the TOPS mode, scans are performed substantially in the opposite direction to those in spotlight mode. That is, azimuth steering is carried out in each burst such that the SAR sensor "looks" backwards at the beginning of each burst and points forwards at the end of the burst. Unlike the conventional ScanSAR mode, this ensures that each target is illuminated by the entire antenna pattern regardless, thereby allowing better radiometric equalization, in this way making the scalloping effect much less critical.

With regard to this, FIG. 9 schematically shows an example of SAR acquisition logic in TOPS mode. In particular, as shown in FIG. 9 (where reference is made to the x-z plane of the previously introduced xyz Cartesian reference system, already used in FIGS. 1-7), a SAR sensor (not shown in FIG. 9 for simplicity of illustration), during movement along the flight direction d, performs a series of acquisition cycles $C_i$ (where i=1, 2, . . . ) in succession, each of which is divided into three bursts $B_1^i$, $B_2^i$, $B_3^i$). In detail, in the first burst $B_1^i$ of each acquisition cycle $C_i$ the SAR sensor acquires (or observes) a first subswath, in the second burst $B_2^i$ of each acquisition cycle $C_i$ the SAR sensor acquires (or observes) a second subswath, and in the third burst $B_3^i$ of each acquisition cycle $C_i$ the SAR sensor acquires (or observes) a third subswath. Obviously, also in the case of TOPS, acquisitions of a same subswath must be performed so as to ensure acquisition continuity along the azimuth direction x.

As already explained above, azimuth steering is carried out in each burst such that each target is illuminated by the entire antenna pattern regardless, in this way making the scalloping effect much less critical. With regard to this:

FIG. 10 schematically shows, from a radiometric standpoint, how a first target (indicated by reference numeral 20) is illuminated when positioned, in azimuth, at the centre of the portion of the first subswath observed in the first burst $B_1^{\ 1}$ of the first acquisition cycle $C_i$ in the example of TOPS acquisition in FIG. 9; and FIG. 11 schematically shows, from a radiometric standpoint, how a second target (indicated by reference numeral 21) is illuminated when arranged, in azimuth, in a lateral position of the portion of the first subswath observed in the first burst $B_1^{\ 1}$ of the first acquisition cycle $C_i$ in the example of TOPS acquisition in FIG. 9.

As happens in the canonical ScanSAR mode, in the TOPS mode the targets are also always seen by the sensor at a delta angle (or for a delta time) smaller than that typical of the stripmap mode. It follows that the TOPS mode also allows, like ScanSAR (even if with different equations/constraints with respect to the canonical ScanSAR), to extend the swath in range at the cost of degrading the azimuth resolution with respect to the stripmap mode.

As is known, the need to scan areas with common azimuth angles is pervasive in the literature, where reference is often made to so-called azimuth spectral overlap. In particular, the existence of a physical constraint is conjectured in the literature for which the absence of azimuth angular overlap causes total incoherency between SAR images. This incoherence would thus make any interferometric measurement impossible.

Examples of SAR image acquisition techniques based on "almost-zero-Doppler" geometry (i.e. on the traditional constraint of azimuth spectral overlap) for interferometric applications are provided in:

Marcus Schwäbisch et al., "Section 5: Technical Issues" in "Study on Concepts for Radar Interferometry from Satellites for Ocean (and Land) Applications (KoRIOLIs)", FINAL REPORT, 1 Apr. 2002, pages 1-34, where it is clearly asserted that the Doppler spectral overlap of the various acquisitions (and, therefore, the use of the same squint angles) is a necessary prerequisite to achieve data coherency and, consequently, to be able to perform interferometric processing (with regard to this, please refer, for example, to that explained on pages 5-15 of "Section 5: Technical Issues" in "Study on Concepts for Radar Interferometry from Satellites for Ocean (and Land) Applications (KoRIOLIs)"); and A. Ferretti et al., "InSAR Principles: guidelines for SAR Interferometry Processing and Interpretation", European Space Agency (ESA) Publications, TM-19, February 2007, where it is again unequivocally asserted that interferometry is only possible if there is spectral overlap (with regard to this, please refer, for example, to that explained on page C-103 of "InSAR Principles: guidelines for SAR Interferometry Processing and Interpretation").

In many cases, for interferometric purposes, the spectral part of two or more SAR acquisitions that is not common is eliminated by imposing that each target be focused with the same azimuth angles (in this way, unfortunately reducing performance, especially resolution). This type of processing is also known as common band filtering and has the big disadvantage of only allowing an extremely reduced amount of data to be used for interferometric applications. Obviously, common band filtering is unusable in cases where spectral overlap is minimal or null, i.e. typical of SAR acquisitions in burst mode (for example ScanSAR and PingPong).

In particular, various techniques have also been proposed in the past for managing spectral overlap and, consequently, for the interferometric processing of SAR acquisitions obtained in burst mode, such as, for example:

A. Monti Guarnieri and C. Prati, "ScanSAR Focusing and Interferometry", IEEE Transactions on Geoscience and Remote Sensing, Vol. 34, No. 4, July 1996, pages 1029-1038, in which the exclusive use of data that has a non-zero azimuth overlap and filtering of only the common azimuth spectrum parts is contemplated;

J. Holzner and R. Bamler, "Burst-Mode and ScanSAR Interferometry" IEEE Transactions on Geoscience and Remote Sensing, Vol. 40, No. 9, September 2002, pages 1917-1934, in which the importance of azimuth overlap is underlined for interferometric applications based on SAR acquisitions in ScanSAR mode, and it is proposed to manage it through synchronization filtering of the bursts and through the use of the same centroids for processing the raw data, but without performing any compensation for radiometric aberrations (scalloping) due to the antenna pattern, in this way introducing decorrelation phenomena;

R. Grandin, "Interferometric Processing of SLC Sentinel-1 TOPS Data", Proceedings of European Space Agency, SP-371, FRINGE 2015, 23-27 Mar. 2015, Frascati (Rome), Italy, in which the importance of acquisitions with the same Doppler spectrums is underlined and some compensation techniques based on indirect estimates of the phenomenon are proposed; in particular, these techniques require a high capacity of image co-registration, as even minimal errors in co-registration cause significant errors in the final interferometric products (in fact, acquisitions with a minimal difference in Doppler centroid were chosen for the proposed examples, i.e. acquisitions in which phenomenology has a limited impact); and P. Prats, R. Scheiber and F. De Zan, "Interferometric TOPS Chain Description", SEOM-INSARAP: Sentinel-1 InSAR Performance Study with TOPS Data, INSARAP Workshop 10 Dec. 2014, in which it is underlined that, in the case of centroid difference, data filtering is necessary and, consequently, the loss of information; even if not emphasized, this entails the impossibility of using the data in the case of significant differences in the centroids.

Finally, the constraint related to azimuth spectral overlap is dealt with in a very thorough manner in U.S. Pat. No. 9,019,144 B2, where it is demonstrated that this constraint can actually be removed, because the phenomenon observed in the literature is due to mathematical relations and not to physical characteristics. In particular, U.S. Pat. No. 9,019,144 B2 concerns a method for acquiring SAR images for interferometric processing, which comprises acquiring, via one or more SAR sensors transported in flight, SAR images of a same area with an acquisition geometry such as to allow the interferometric processing of said SAR images. In detail, the method according to U.S. Pat. No. 9,019,144 B2 is characterized by an acquisition geometry in which each SAR image of the area is acquired in a respective acquisition direction that defines a respective squint angle with respect to the flight direction, and in which the squint angles are such as to determine an average squint angle other than zero. Moreover, the SAR images are acquired by a single SAR sensor that is transported in flight by an aerial/satellite platform, uses a single antenna and acquires the SAR images in a single pass of the aerial/satellite platform.

OBJECT AND SUMMARY OF THE INVENTION

A first object of the present invention is to provide a technique capable of mitigating, at least in part, the above-mentioned technical drawbacks of the techniques currently applied, for interferometry purposes, to burst-mode SAR acquisitions.

A second object of the present invention is to also provide a SAR processing technique capable of ensuring spectral overlap even when physically absent (i.e. when the sensors observe the scene with different squint angles).

These and other objects are achieved by the present invention in so far as it relates to a SAR imaging method for interferometric analyses, as defined in the appended claims.

In particular, the SAR imaging method according to the present invention comprises:
- receiving raw SAR data related to two or more SAR acquisitions of one and the same area of the earth's surface carried out by means of one or more synthetic aperture radars; and
- processing the raw SAR data so as to generate SAR images.

The method according to the present invention is characterized in that, for each SAR acquisition, the respective raw SAR data related to said SAR acquisition are processed on the basis of two different sets of processing parameters, which include:
- a first set that is the same for all the SAR acquisitions and which comprises focusing Doppler parameters computed on the basis of physical Doppler parameters related to all the SAR acquisitions; and
- a respective second set, which comprises respective radiometric equalization Doppler parameters related to said SAR acquisition and computed on the basis of respective physical Doppler parameters related to said SAR acquisition. In particular, processing includes:
- focusing the raw SAR data related to all the SAR acquisitions on the basis of said focusing Doppler parameters; and
- for each SAR acquisition, applying a respective radiometric equalization, based on the respective radiometric equalization Doppler parameters, to the respective SAR data to compensate for possible differences in pointing of the synthetic aperture radar(s) used to carry out the SAR acquisitions, without degrading azimuth resolution and without introducing radiometric distortions.

Conveniently, said SAR imaging method further comprises:
- estimating, for each SAR acquisition, respective physical Doppler parameters indicative of the pointing of the synthetic aperture radar used to carry out said SAR acquisition;
- computing, for each SAR acquisition, the respective radiometric equalization Doppler parameters on the basis of the respective physical Doppler parameters estimated; and
- computing the focusing Doppler parameters on the basis of the physical Doppler parameters estimated for all the SAR acquisitions.

BRIEF DESCRIPTION OF DRAWINGS

For a better understanding of the present invention, some preferred embodiments, provided by way of non-limitative example, will now be described with reference to the accompanying drawings (not to scale), in which.

DETAILED DESCRIPTION OF PREFERRED EMBODIMENTS OF THE INVENTION

Figure 1:
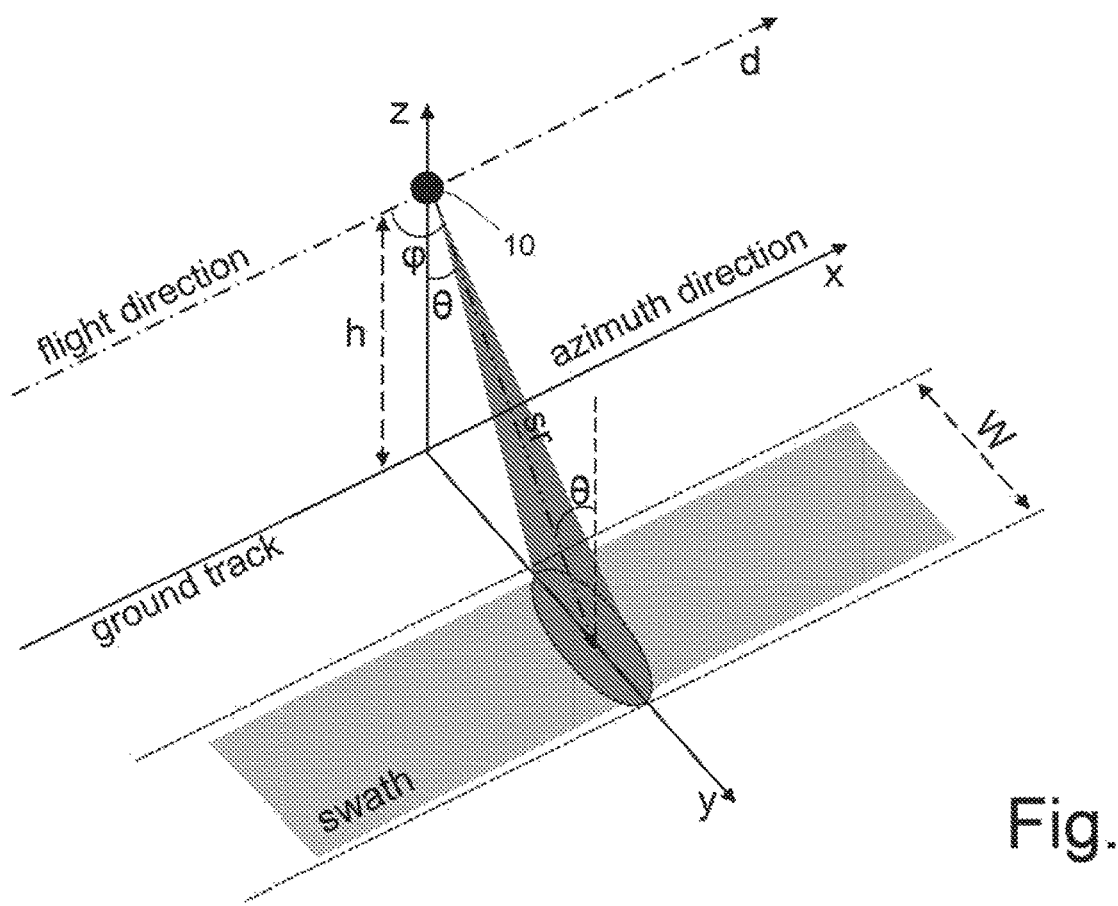
FIGS. 1, 2 and 3 schematically show an example of SAR acquisition in stripmap mode.
Figure 2:
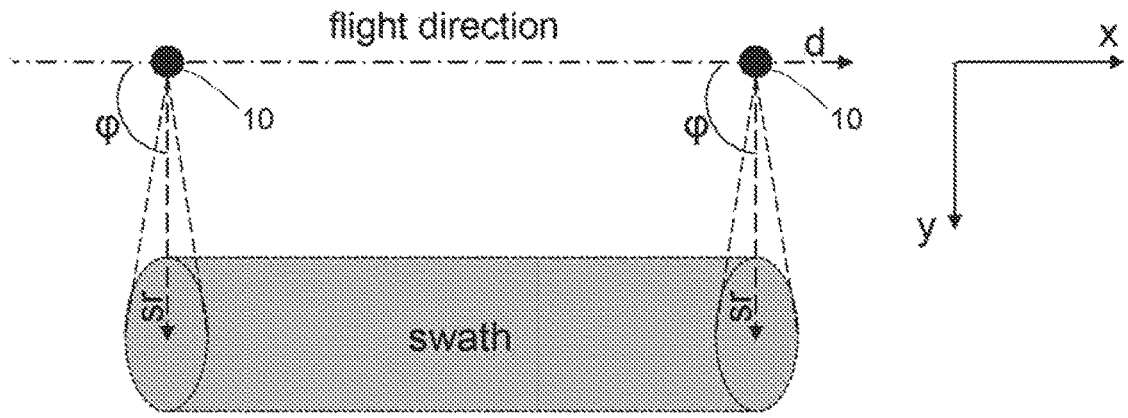
Figure 3:
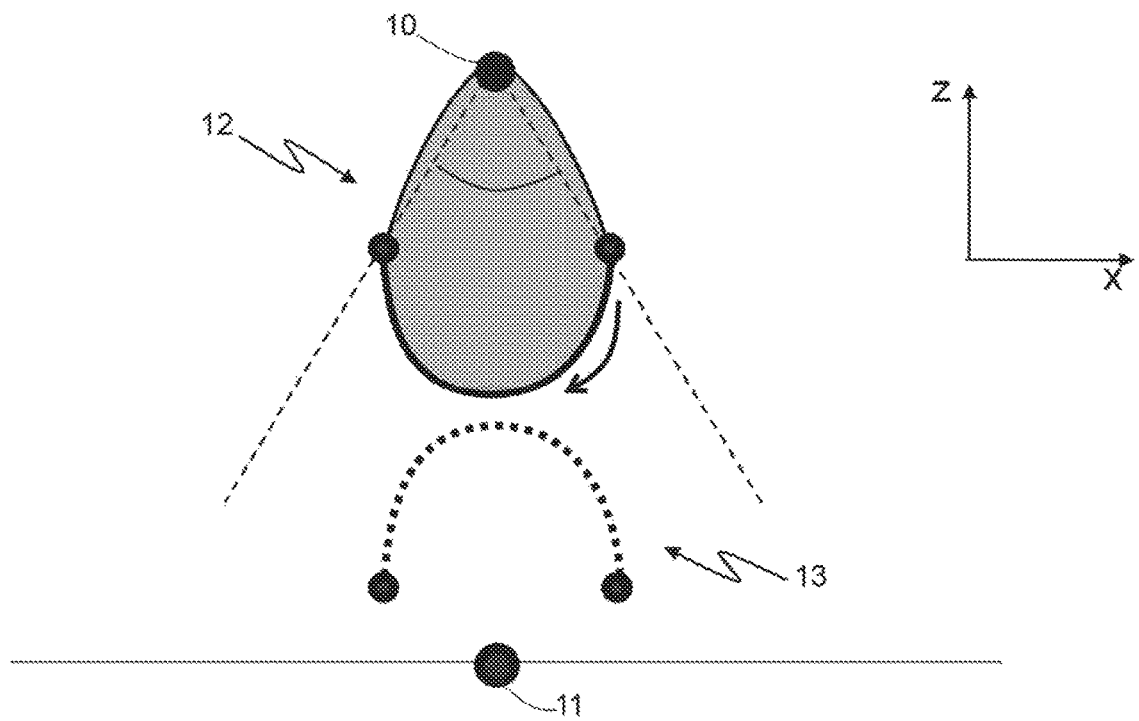
Figure 4:
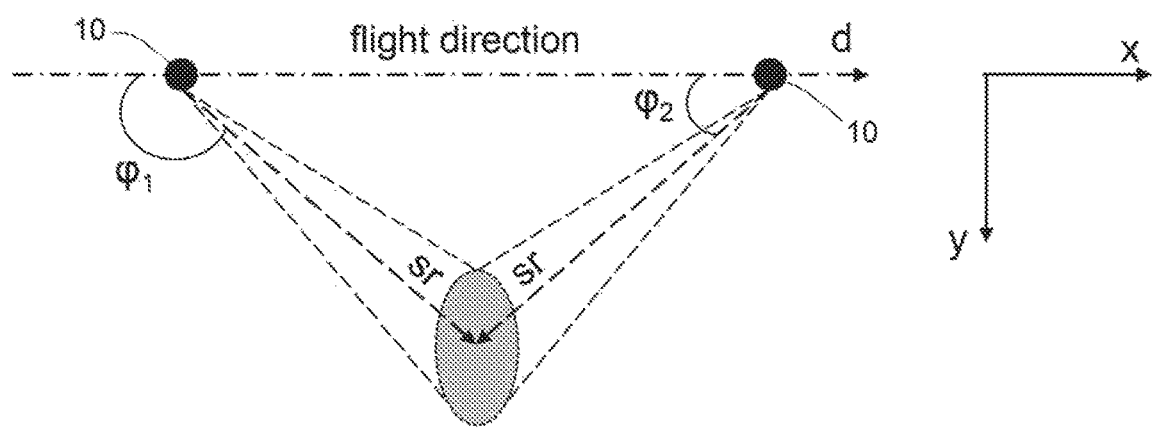
FIG. 4 schematically shows an example of SAR acquisition in spotlight mode.
Figure 5:
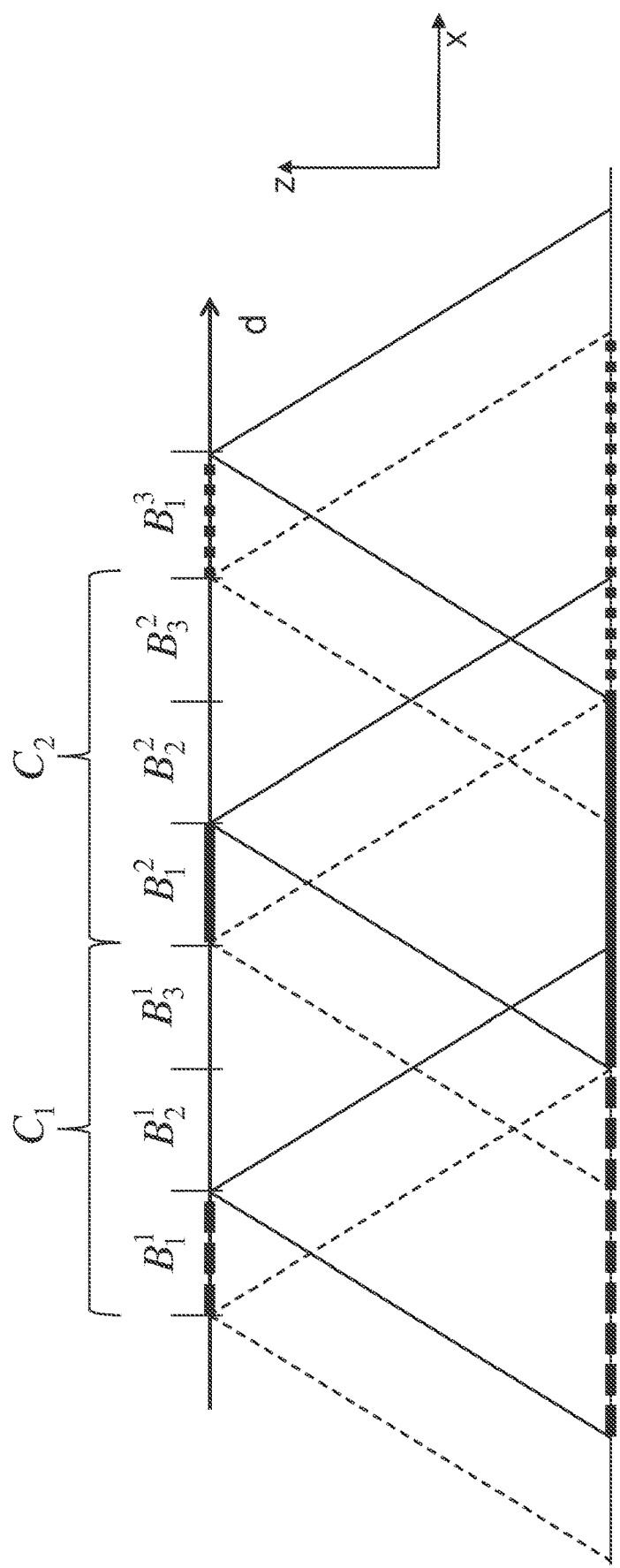
FIGS. 5, 6, 7 and 8 schematically show an example of SAR acquisition in ScanSAR mode.
Figure 6:
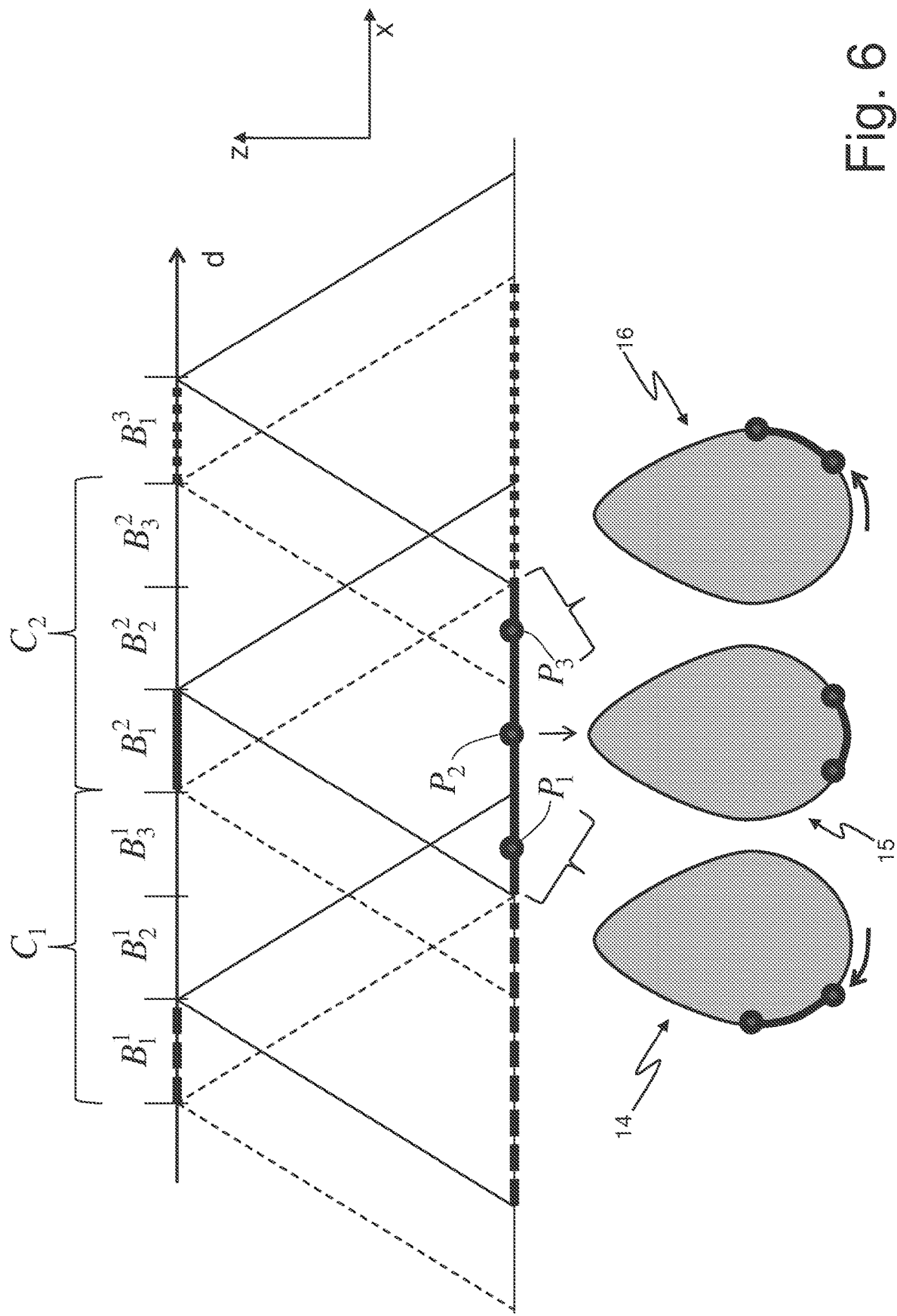
Figure 7:
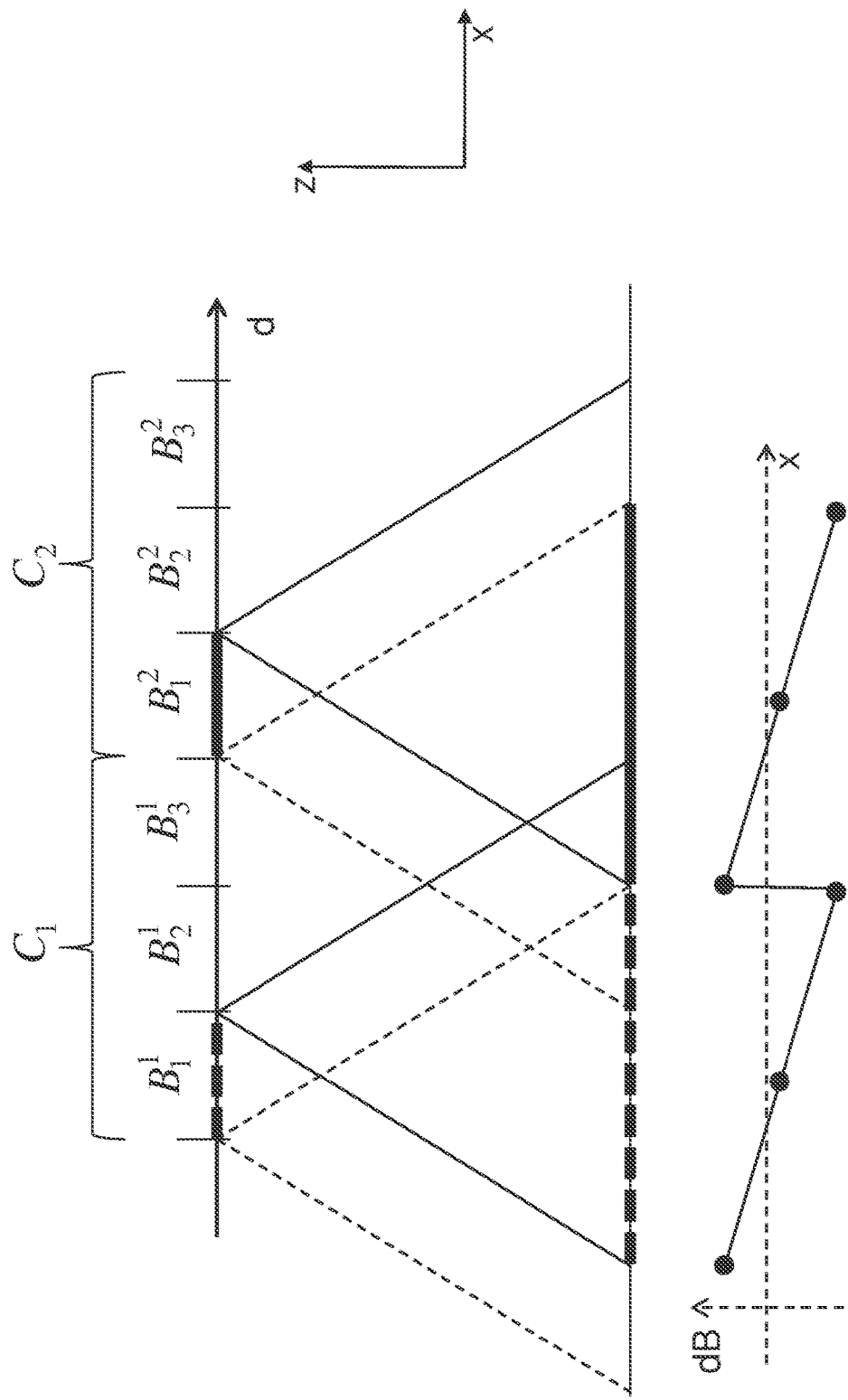
Figure 8:
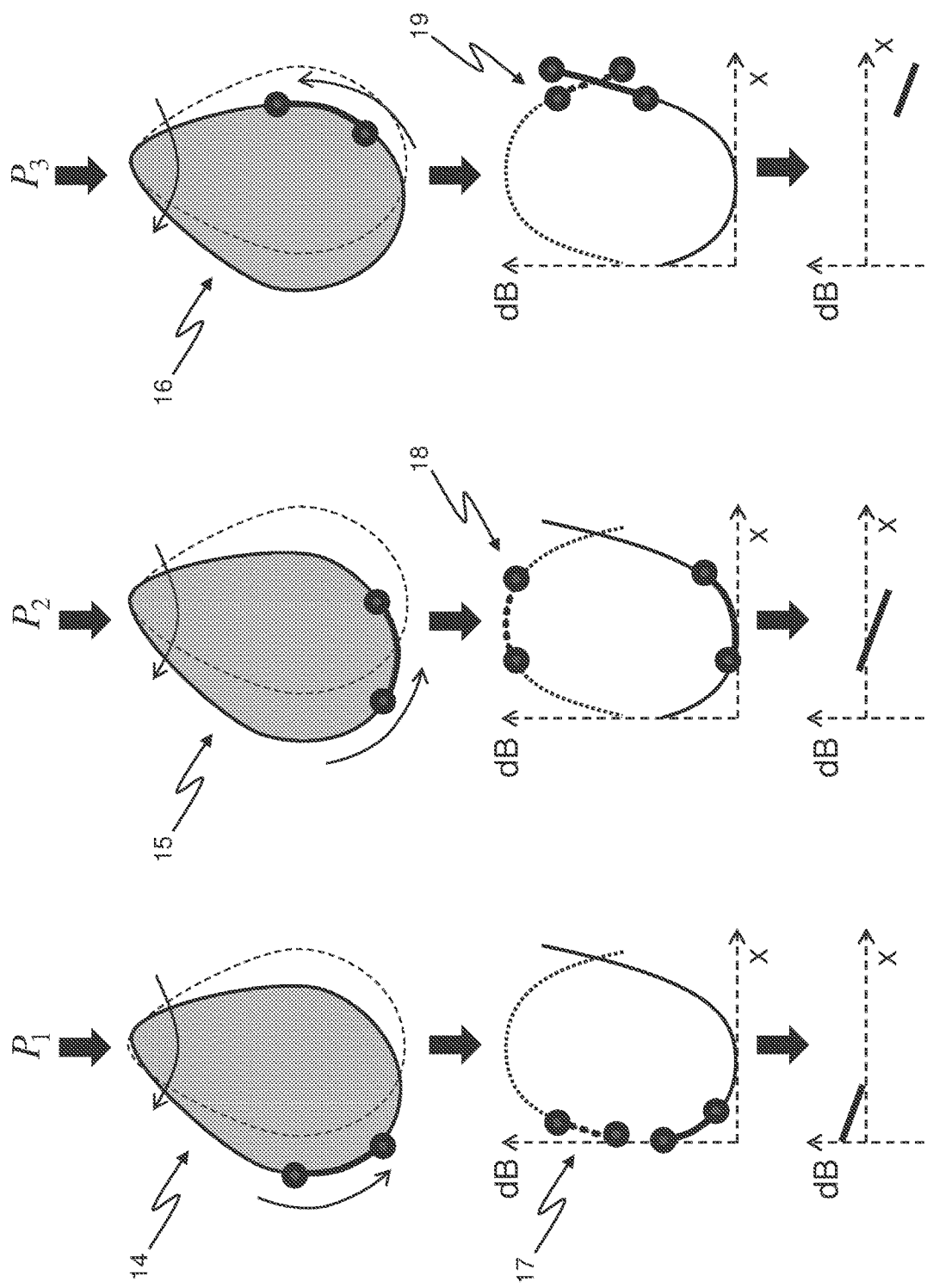
Figure 9:
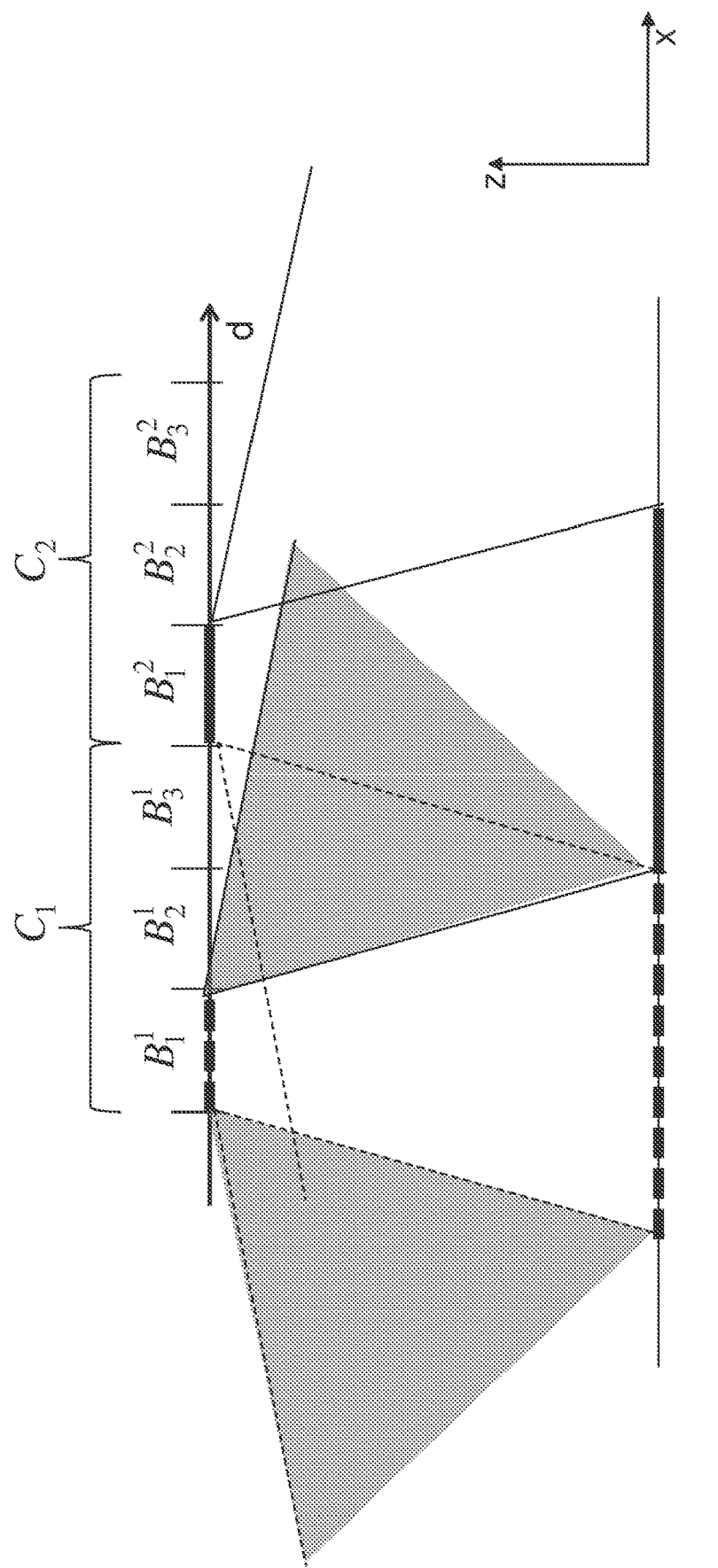
FIGS. 9, 10 and 11 schematically show an example of SAR acquisition in TOPS mode.
Figure 10:
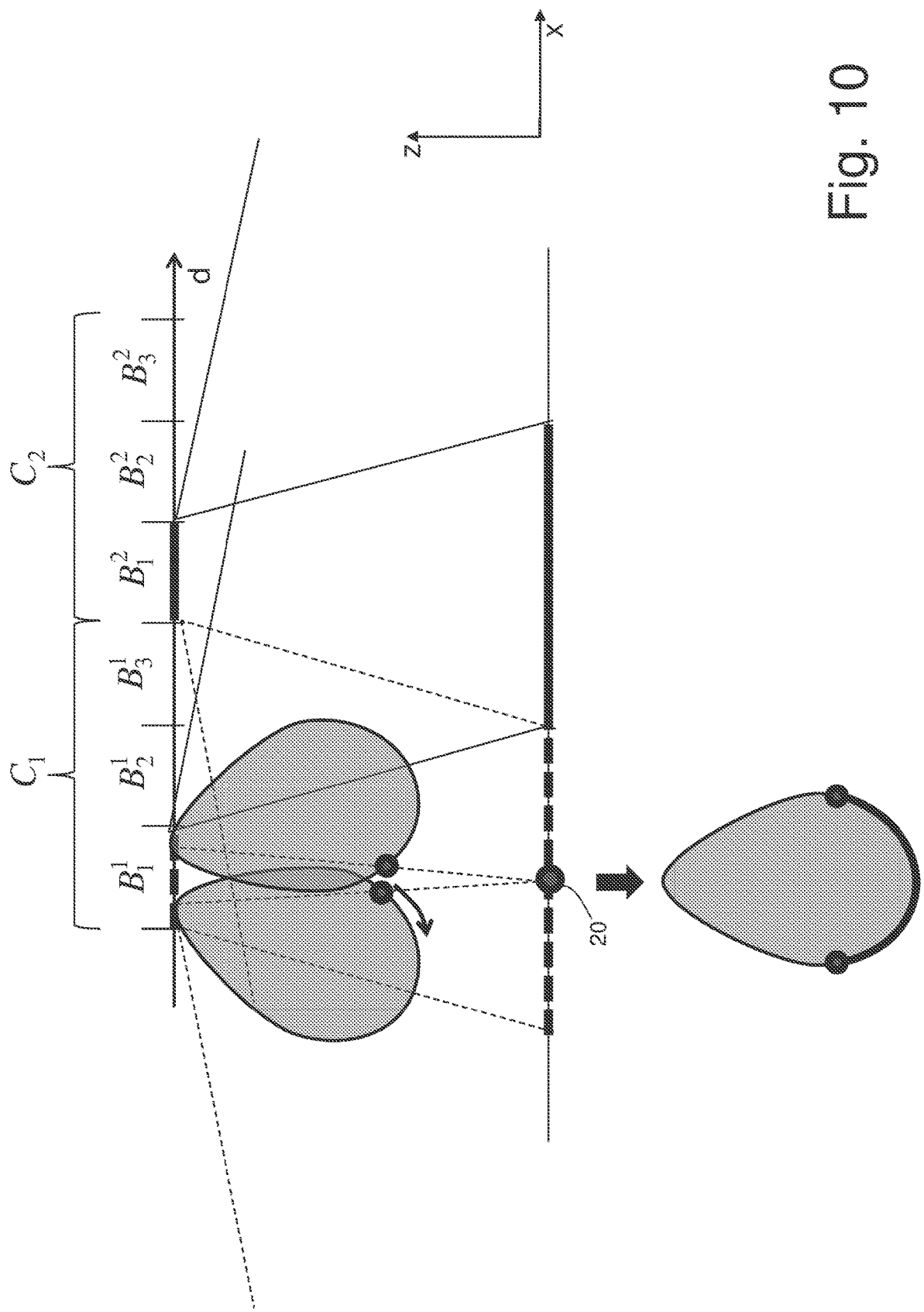
Figure 11:
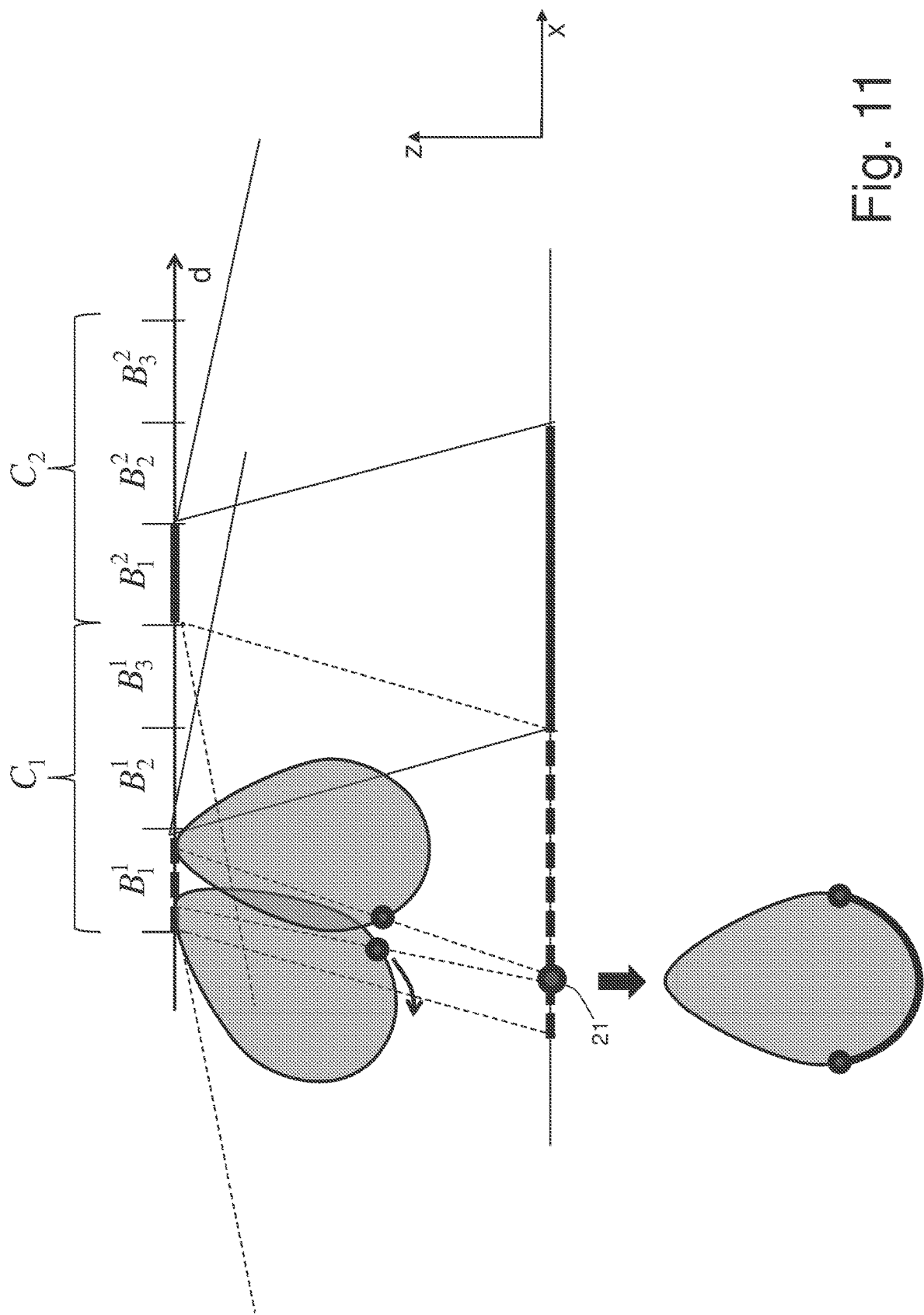

The following description is provided to enable an expert in the field to embody and use the invention. Various modifications to the embodiments shown will be immediately obvious to experts and the generic principles described herein could be applied to other embodiments and applications without departing from the scope of protection of the present invention.

Thus, the present invention is not intended to be limited to just the embodiments described and shown herein, but is to be accorded the widest scope consistent with the principles and features disclosed herein and defined in the appended claims.

The present invention concerns a SAR imaging method that comprises:
- receiving raw SAR data related to two or more SAR acquisitions of one and the same area of the earth's surface carried out by means of one or more synthetic aperture radars (preferably SAR acquisitions performed in burst mode; even more preferably, acquisitions of the ScanSAR, PingPong or TOPS type); and
- processing the raw SAR data so as to generate SAR images.

In particular, processing includes:
- focusing the raw SAR data related to the two or more SAR acquisitions on the basis of focusing Doppler parameters computed on the basis of physical Doppler parameters related to the two or more SAR acquisitions; and
- for each SAR acquisition, applying to the respective SAR data a respective radiometric equalization based on respective radiometric equalization Doppler parameters computed on the basis of respective physical Doppler parameters related to said SAR acquisition.

Conveniently, said SAR imaging method further comprises:
- estimating, for each SAR acquisition, respective physical Doppler parameters (preferably a respective physical Doppler centroid and/or a respective physical Doppler rate) indicative of the pointing of the synthetic aperture radar used to carry out said SAR acquisition;
- computing, for each SAR acquisition, the respective radiometric equalization Doppler parameters (preferably a respective radiometric equalization Doppler centroid and/or a respective radiometric equalization Doppler rate) on the basis of the respective physical Doppler parameters estimated; and
- computing the focusing Doppler parameters (preferably a focusing Doppler centroid and/or a focusing Doppler rate) on the basis of the physical Doppler parameters estimated for the two or more SAR acquisitions.

More conveniently, said SAR imaging method also comprises receiving, for each SAR acquisition, respective data indicative of respective spatial and temporal characteristics of said SAR acquisition; said respective data indicative of respective spatial and temporal characteristics of each SAR acquisition preferably including data indicative of pointing(s) and position(s) of the synthetic aperture radar used for carrying out said SAR acquisition and of corresponding acquisition time(s).

In addition, for each SAR acquisition, the respective physical Doppler parameters are conveniently estimated on the basis of the respective data indicative of the respective spatial and temporal characteristics of said SAR acquisition.

Preferably, the two or more SAR acquisitions are SAR acquisitions performed in burst mode and said SAR imaging method also comprises:
  for each SAR acquisition, determining the position of each respective burst on the basis of the respective data indicative of the respective spatial and temporal characteristics of said SAR acquisition; and determining reference positions of the bursts on the basis of the positions of the bursts of each SAR acquisition; wherein the raw SAR data are also processed on the basis of the reference positions of the bursts.

More preferably, said SAR imaging method also comprises:
  co-registering the generated SAR images;
  detecting and estimating burst position errors on the basis of the co-registered SAR images;
  correcting the reference positions of the bursts on the basis of the estimated burst position errors; and
  processing the raw SAR data again on the basis of the corrected reference positions of the bursts.

Conveniently, said SAR imaging method also comprises:
  detecting and estimating errors in the radiometric equalization Doppler parameters and/or the focusing Doppler parameters on the basis of the generated SAR images;
  updating the radiometric equalization Doppler parameters and/or the focusing Doppler parameters on the basis of the estimated errors; and
  processing the raw SAR data again on the basis of the updated radiometric equalization Doppler parameters and/or focusing Doppler parameters.

The present invention derives from the Applicant's insight according to which the phenomenon observed in the literature is actually due to mathematical relations and not physical characteristics, it therefore being possible to process images so as to ensure spectral overlap even if physical overlap is absent. Thanks to the present invention it is therefore possible to avoid the performance limitation and extend interferometric analyses that envisage data coherency even to acquisitions in burst mode.

In particular, unlike the provisions in the literature, according to the present invention it is possible to obtain correct images from the radiometric standpoint and with maximum spectral overlap, i.e. coherent images, by separating the Doppler parameters (conveniently Doppler centroid and Doppler rate) for radiometric compensation from those for focusing.

In fact, in the burst modes, especially in the TOPS mode, the centroid varies rapidly as a function of the azimuth position of the target (Doppler rate); therefore, if different Doppler rates are used in processing the interferometric acquisitions, for example associated with nominal steering variations of the antennas in the individual acquisitions, the individual targets are processed with different and therefore incoherent angles.

In mathematical terms, referring to the angle along the azimuth with respect to the zero Doppler of a satellite at a generic instant as beta ($\beta$), after removal of the quadratic related to azimuth focusing, the generic beta response ($\beta$) obtained from the integral of a semi-aperture equal to delta ($\Delta$), related to the $m^{th}$ image, can be written as:

$$S_\Delta^m(\beta) = A_i \exp\{-j2\pi\varphi_i\} \int_{-\Delta+D_C^p}^{\Delta+D_C^p} \exp\{j2\pi\theta(\beta-\theta_i)\} \cdot \frac{G_a(\theta-\theta_i+D_C)}{F_w(\theta-\theta_i+D_C^{Pa})} d\theta, \quad (1)$$

where $A_i$, $\theta_i$, $\varphi_i$ respectively represent the amplitude, position and phase of the generic $i^{th}$ target, $G_a$ is the antenna's two-way gain, $F_w$ represents the whitening filter (or filter for radiometric equalization of the antenna pattern), and
  $D_C$ represents the Doppler centroid related to the squint angle with which the generic target was acquired,
  $D_C^p$: represents the Doppler centroid used for processing related to the focusing direction of the data, and
  $D_C^{Pa}$ represents the Doppler centroid used during processing for compensating the radiometric variations induced by antenna gain.

Current processing algorithms use only one processing centroid for both focusing and radiometric equalization (i.e. the whitening filter) and are based on the assumption that this processing centroid must coincide with that of the physical acquisition; therefore, under this assumption and also assuming to perfectly know the antenna pattern and to perfectly estimate the physical Doppler centroid, it is found that $$F_w = G_a$$

$$D_C^p = D_C = D_C^{Pa} \quad (2)$$

which gives $$S_\Delta^m(\beta) = A_i \exp\{-j2\pi\varphi_i\} \exp\{j2\pi(\beta-\theta_i)D_C^p\} \frac{\sin(\pi\Delta(\beta-\theta_i))}{\pi(\beta-\theta_i)}. \quad (3)$$

Considering a second interferometric acquisition with a target phase difference of $\Delta_{int}$ acquired with a different Doppler centroid $D'_C^p$, gives:

$$S_\Delta'^m(\beta) = A_i \exp\{-j2\pi(\varphi_i+\Delta_{int})\} \exp\{j2\pi(\beta-\theta_i)D'_C^p\} \frac{\sin(\pi\Delta(\beta-\theta_i))}{\pi(\beta-\theta_i)}. \quad (4)$$

Therefore, the phase difference between the two acquisitions is given by:

$$s_\Delta^m(\beta)^*\text{conj}(S'_\Delta^m(\beta))|_{Phase} = 2\pi(\Delta_{int}+(\beta-\theta_i)\cdot(D_C^p-D'_C^p)). \quad (5)$$

The term $$(\beta-\theta_i)\cdot(D_C^p-D'_C^p) \quad (6)$$

causes data incoherency.

Figure 12:
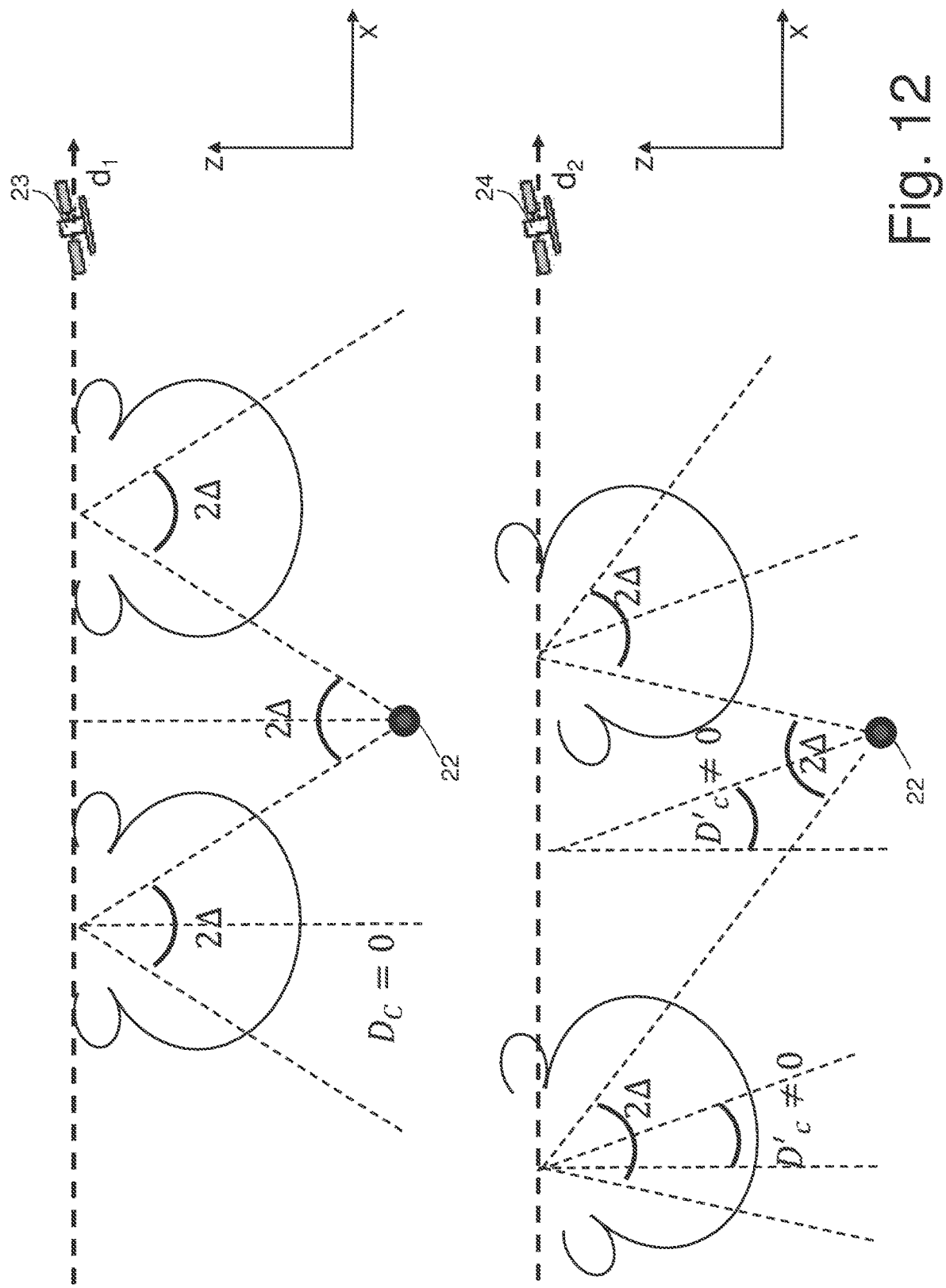
FIG. 12 schematically shows two SAR acquisitions in stripmap mode in which spectral overlap is not present.

For a better understanding of what has just been described, FIG. 12 (where reference is made to the x-z plane of the previously introduced xyz Cartesian reference system, already used in FIGS. 1-7 and 9-11) schematically shows two SAR acquisitions in stripmap mode of a same target 22 where there is no spectral overlap. In particular, the first SAR acquisition is carried out by a first satellite 23 that moves along a first flight direction $d_1$, while the second SAR acquisition is carried out by a second satellite 24 that moves along a second flight direction $d_2$ parallel to the first flight direction $d_1$. In detail, in the example shown in FIG. 12 it emerges that $\Delta_{int}=2\Delta$.

In the ScanSAR, TOPS and PingPong burst modes, in which there is a significant variation in the Doppler parameters depending on the position of the target, equation (1) can be modified by inserting the concept of processing Doppler rate ($D_R^P$), actual acquisition Doppler rate ($D_R$) and Doppler rate used in processing for the whitening filter ($D_R^{Pa}$)). Expressing the Doppler rate as the ratio between azimuth angle and nominal acquisition angle beta ($\beta$), gives:

$$S_\Delta^m(\beta) = A_i \exp\{-j2\pi\varphi_i\} \quad (7)$$

$$\int_{-\Delta+D_C^P+D_R^P*\beta}^{\Delta+D_C^P+D_R^P*\beta} \exp\{j2\pi\theta(\beta-\theta_i)\} \cdot \frac{G_a(\theta-\theta_i+D_C+D_R*\beta)}{F_w(\theta-\theta_i+D_C^{Pa}+D_R^{Pa}*\beta)} d\theta.$$

In this case, term (6) becomes:

$$(\beta-\theta_i) \cdot ((D_C^P + D_R^P*\beta) - (D'_C^P + D'_R^P*\beta)). \quad (8)$$

According to a preferred embodiment of the present invention, two Doppler centroids and two Doppler rates are used, of which:
  a first Doppler centroid and a first Doppler rate are employed for focusing (in particular, for determining the focusing angle), and
  a second Doppler centroid and a second Doppler rate are employed instead for the whitening filter, i.e. for equalizing the radiometric pattern.

By using the same processing Doppler centroid and the same processing Doppler rate for focusing the two images, term (6) (or term (8)) becomes null and the two images preserve coherency.

As previously explained, common band filtering is currently resorted to in order to overcome the spectral overlap problem, i.e. the images/SAR acquisitions are filtered, leaving only the common angles. This technique can only function if the acquisitions have significant spectral overlap and, in any case, has a severe impact on performance. In the burst modes (for example, in ScanSAR mode), the angular aperture is so small that the smallest pointing error of the SAR sensor can cause total absence of spectral overlap, effectively preventing use for interferometric applications.

Figure 13:
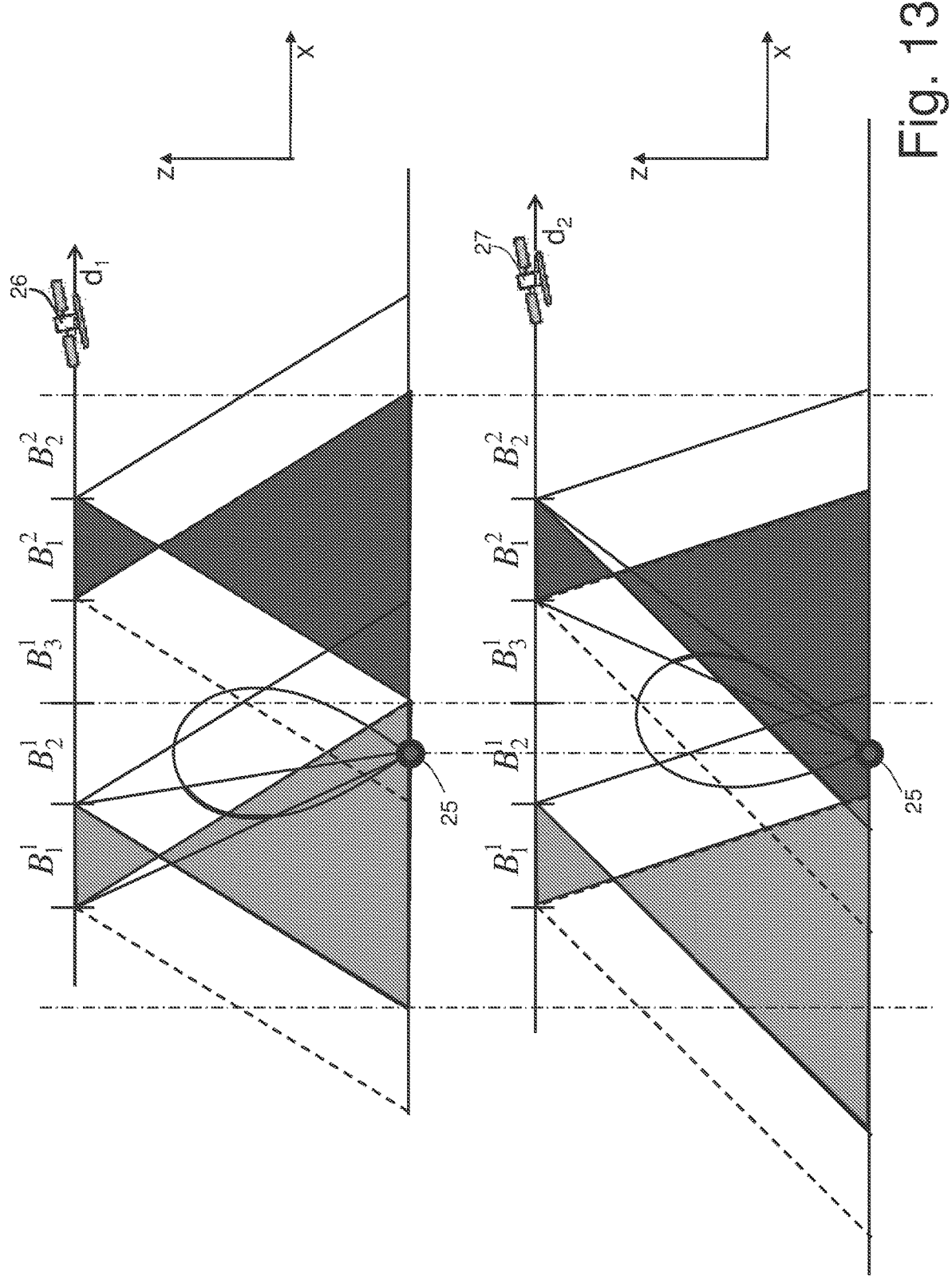
FIG. 13 schematically shows two SAR acquisitions in ScanSAR mode in which spectral overlap is not present.

With regard to this, FIG. 13 (where reference is made to the x-z plane of the previously introduced xyz Cartesian reference system, already used in FIGS. 1-7 and 9-12) schematically shows two SAR acquisitions in ScanSAR mode of a same target 25 where there is no spectral overlap. In particular, the first ScanSAR acquisition is carried out by a first satellite 26 that moves along a first flight direction $d_1$, while the second ScanSAR acquisition is carried out by a second satellite 27 that moves along a second flight direction $d_2$ parallel to the first flight direction $d_1$. Furthermore, the target 25 under consideration is arranged, in azimuth, at the edges of the subswath observed in the first bursts $B_1^i$.

In particular, as shown in FIG. 13, with the current processing techniques, due to the different steering of the antennas (and therefore a different Doppler centroid), the area at the edges in azimuth could be focused, in the different interferometric acquisitions, in non-homologous bursts and therefore with completely different azimuth angles.

This would result in the impossibility of being able to use these two ScanSAR acquisitions for interferometric analyses.

Contrariwise, according to a preferred embodiment of the present invention, a respective radiometric equalization based on a pair of respective Doppler parameters (conveniently, Doppler centroid and Doppler rate) computed on the basis of respective physical Doppler parameters of the ScanSAR acquisition (i.e. on the basis of the respective actual acquisition geometry) is applied to each of the two ScanSAR acquisitions. Furthermore, always according to said preferred embodiment of the present invention, the two ScanSAR acquisitions are both focused on the basis of a same pair of Doppler parameters (conveniently, Doppler centroid and Doppler rate) computed on the basis of the physical Doppler parameters of both ScanSAR acquisitions.

In the case of acquisitions in TOPS mode, the Doppler centroid changes rapidly; therefore, if common Doppler rates are not used, the targets will be processed with different angles, causing incoherence.

The present invention effectively overcomes this limitation and even enables the use of data acquired in burst modes to be used for interferometric purposes, by restoring the constraint from the processing angular aperture to the antenna's angular aperture, parameters that typically do not coincide (especially for burst modes or those with degraded resolution).

It is important to underline the fact that the present invention solves the problem of spectral overlap at the origin and, in consequence, unlike the method according to U.S. Pat. No. 9,019,144 B2, the technique according to the present invention:
  functions for any average squint angle, provided that the maximum squint difference between the various images is less than the angular aperture of the antenna; and
  enables "integrating" each target with the same angles for the various acquisitions, even when these acquisitions have been carried out with different squint angles, without envisaging further data processing for ensuring coherency, such as averaging operations for example, and therefore without the associated loss of resolution.

Figure 14:
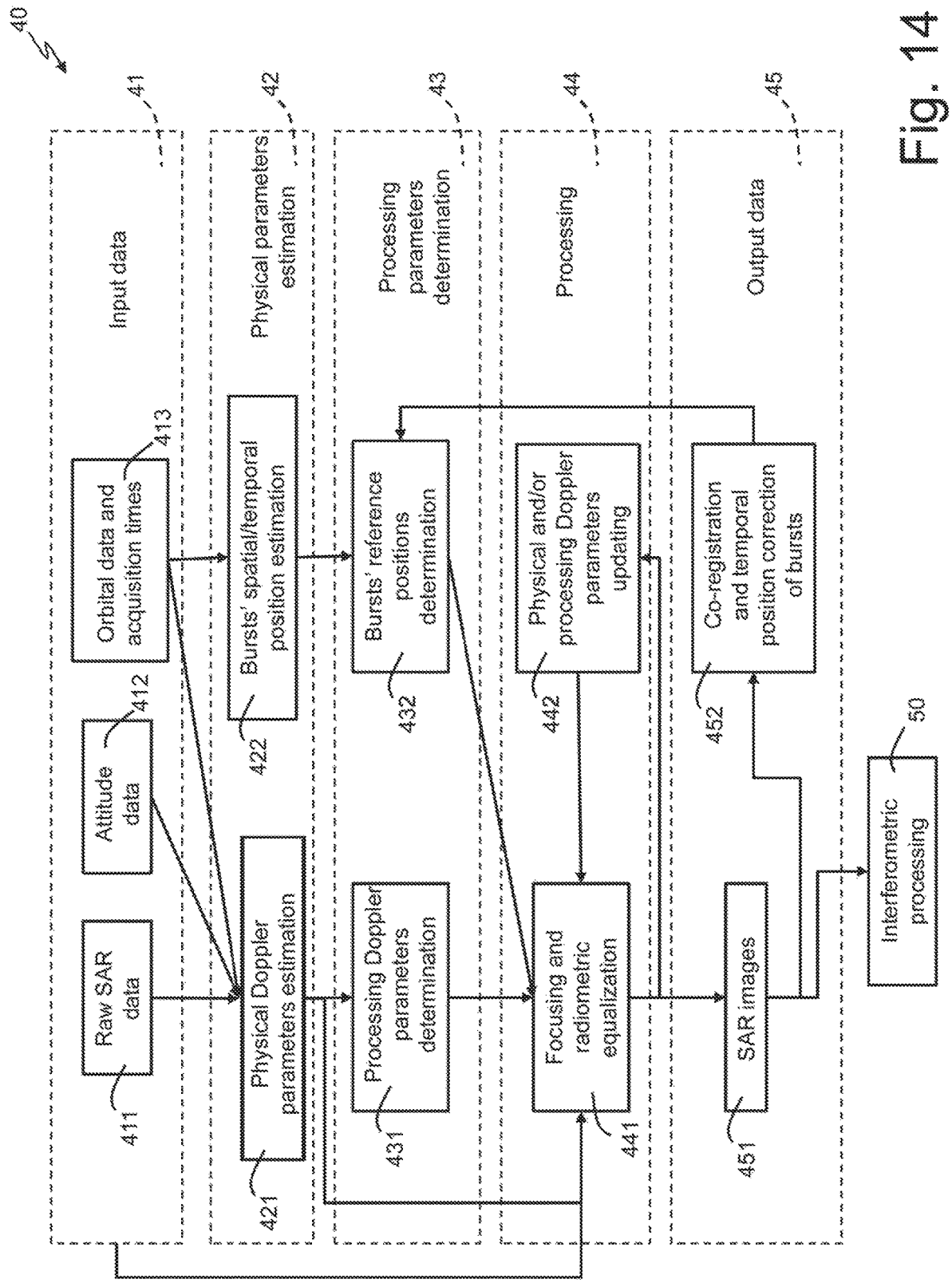
FIG. 14 schematically shows a SAR imaging method according to a preferred embodiment of the present invention.

For a better understanding of the present invention, FIG. 14 shows a flowchart of a method for generating SAR images (indicated as a whole by reference numeral 40) according to a preferred embodiment of the present invention.

In particular, the method 40 comprises:
  receiving input data (macroblock 41) related to two or more SAR acquisitions of a same area of the earth's surface carried out, preferably in burst mode, by one or more satellites by means of one or more SAR sensors; said input data conveniently comprise, for each SAR acquisition, respective raw SAR data (block 411) (i.e. data produced by the respective SAR sensor that performed the acquisition), respective attitude data (block 412) indicative of respective characteristics of the SAR acquisition (conveniently, the pointing of the respective SAR sensor, characteristics of the respective antenna beam used, etc.) and respective orbital data and acquisition times (block 413), said respective orbital data being related to the respective satellite that carried out the SAR acquisition and said respective acquisition times being indicative of respective temporal characteristics of the SAR acquisition;
  estimating physical parameters (macroblock 42) of the SAR acquisitions on the basis of the input data;

determining processing parameters (macroblock 43) on the basis of the physical parameters;

processing (macroblock 44) the input data on the basis of the physical and processing parameters; and providing as output (macroblock 45) SAR images (block 451) ready for being processed by one or more techniques of interferometric analysis (block 50), for example for estimating a DEM (digital elevation model), or for purposes of differential interferometry and/or coherent change detection.

In detail, with regard to estimating the physical Doppler parameters (macroblock 42), starting from the raw SAR data (block 411) and the attitude data (block 412) of each single SAR acquisition, an estimate is obtained of the physical Doppler parameters (Doppler centroids and/or Doppler rate) indicative of all the azimuth steering related to the single SAR acquisitions (block 421). Furthermore, on the basis of the orbital data and related acquisition times (block 413) of each single SAR acquisition, the spatial position (or, in an equivalent manner, the temporal position) of each single burst of each single SAR acquisition (block 422) is determined.

Instead, with regard to determining the processing parameters (macroblock 43), on the basis of the physical Doppler parameters (Doppler centroids and Doppler rate), in particular on the basis of the azimuth steering related to the single SAR acquisitions, processing Doppler parameters (block 431) (Doppler centroids and Doppler rate) are computed, which include:

for each SAR acquisition, respective radiometric equalization Doppler parameters computed on the basis of the respective physical Doppler parameters related to said SAR acquisition, in particular on the basis of the actual pointing of the SAR sensor when performing said SAR acquisition; and focusing Doppler parameters computed on the basis of the physical Doppler parameters related to all the SAR acquisitions.

Conveniently, determination of the processing parameters (macroblock 43) also includes determining an equivalent master (in fact, if the Doppler centroid values of each acquisition are known, it is possible to define a reference value, for example an average value).

Furthermore, reference spatial/temporal positions of the bursts (block 432) (for example, those that maximize spatial/temporal overlap) are determined on the basis of the spatial/temporal position of each single burst of each single SAR acquisition.

Instead, with regard to processing (macroblock 44), the raw SAR data (block 411) related to the two or more SAR acquisitions are processed on the basis of the physical Doppler parameters, the processing Doppler parameters and the reference spatial/temporal positions of the bursts, so as to form SAR images (block 451). In particular, the processing (macroblock 44) comprises (block 441):

focusing the raw SAR data related to all the SAR acquisitions on the basis of the focusing Doppler parameters, in this way obtaining corresponding images (block 451) focused in the radar domain (slant range—azimuth); and for each focused SAR acquisition, applying to the respective SAR data a respective radiometric equalization based on the respective radiometric equalization Doppler parameters related to said SAR acquisition.

Through this processing (macroblock 44), it is possible to obtain final products with minimal radiometric artefacts and such that each target becomes "integrated" with the same angles for the various acquisitions.

Furthermore, after focusing and radiometric equalization (block 441), the estimates of the physical and/or processing Doppler parameters can be conveniently corrected (block 442) for subsequent use in performing new focusing and radiometric equalization (block 441). In particular, the physical and/or processing Doppler parameters can be corrected by analysing any artefact remnants in the SAR images.

In addition, the SAR images are co-registered and, after azimuth co-registration, it is possible to estimate any burst position errors (due, for example, to errors in the estimates of the nominal positions of the SAR sensors) and, if necessary, correct the reference spatial/temporal positions of the bursts (blocks 452 and 432), and then reuse them for performing new focusing and radiometric equalization (block 441).

In the end, final products are obtained that are compatible with the standard algorithms for interferometric processing (block 50).

The method 40 is preferably implemented by electronic processing means opportunely configured and programmed to execute the aforementioned steps of said method 40. Conveniently, said electronic processing means are configured to receive the input data (macroblock 41) directly from a SAR remote sensing system and/or a database. Said electronic processing means can be configured to provide the generated SAR images (block 451) to a processing system for interferometric analyses, or can be opportunely programmed to execute one or interferometric processing operations (block 50) on the basis of said SAR images (for example, for computing one or more heights or, more generally, for estimating a DEM, for the purposes of differential interferometry and/or change detection, or computing a interferogram, a coherency map, etc.).

Obviously, although described in relation to satellite SAR acquisitions, the method 40 can be used with both space SAR acquisitions (for example, performed by satellites or spacecraft) and aerial SAR acquisitions (for example, performed by planes, UAVs, helicopters, etc.).

In the same manner, although it has been described in relation to SAR acquisitions in burst mode, the method 40 is obviously usable, mutatis mutandis, also for SAR acquisitions in stripmap and spotlight modes.

The technical advantages of the present invention are immediately evident from the foregoing description.

In particular, it is important to emphasize the fact that, as previously explained, the present invention effectively overcomes the aforementioned limitations of the currently known techniques because it is capable of ensuring spectral overlap even if it is physically absent.

It is also important to note that no known technique uses different Doppler parameters for focusing and for radiometric compensation due to the azimuth antenna pattern.

In particular, the aforementioned article "*Burst-Mode and ScanSAR Interferometry*" proposes the use, as in the present invention, of the same centroids for processing raw data, but, unlike the present invention, it renounces to compensating radiometric aberrations (scalloping) due to the antenna pattern, introducing decorrelation phenomena and, consequently, differences between the images that reduce the performance of the final interferometric products. In addition, it is important to stress that "*Burst-Mode and ScanSAR Interferometry*" makes no mention whatsoever of using a same Doppler rate, deals exclusively with the ScanSAR mode and in no way, postulates the use of double parameters for focusing and for radiometric compensation (which is not implemented).

As previously explained, also "*Optimal "focusing" for low resolution ScanSAR*" teaches the use of a single set of processing parameters, while the possibility of using two distinct sets of processing parameters (one for focusing and one for radiometric equalization) is neither contemplated nor postulated whatsoever in said article.

In particular, in several parts of "*Optimal "focusing" for low resolution ScanSAR*", the authors talk of a single set of focusing parameters for each acquisition, while no technique is introduced to compensate for possible differences in azimuth steering between the various interferometric acquisitions.

In detail, in "*Optimal "focusing" for low resolution ScanSAR*", the Doppler centroid is considered to be a specific single parameter of each acquisition that has a single value (in particular, the Doppler centroid is assumed equal to zero as an acquisition geometry of the "zero Doppler" type is assumed in the article).

The same also applies to the Doppler rate, which in "*Optimal "focusing" for low resolution ScanSAR*" is considered a single parameter.

This article does not provide any solution to the problem related to SAR acquisitions performed using different azimuth acquisition directions (i.e. using different squint angles).

In particular, in paragraph V-A of "*Phase Preserving Processing*", on page 487 of "*Optimal "focusing" for low resolution ScanSAR*" it is stated: "An important factor of the final interferometric quality is processor phase distortion. In low TBP$_{az}$ [Azimuth Time Bandwidth Product] ScanSAR interferometry, a decorrelation source is introduced by a different FIRF [Focused Impulse Response Function] shape in the two co-registered focused images. This may be the case when the two AAP [Azimuth Antenna Pattern] are shifted or when one of the two images is synthesized from a SAR focused image . . . ".

This paragraph V-A of "*Optimal "focusing" for low resolution ScanSAR*" is the only part of the article in which the relation between different acquisitions for interferometric purposes is discussed. Decorrelation due to the use of different azimuth antenna patterns is mentioned in "*Optimal "focusing" for low resolution ScanSAR*" as a constraint, without any solution being provided for the compensation of this decorrelation. In fact, in the same paragraph (i.e. V-A) of "*Optimal "focusing" for low resolution ScanSAR*", the authors state: "In this case the MMSE [Minimum Mean Square Error] solution gives a decorrelation comparable to that achieved by a cosine windowed reference, however MMSE performs better since it explores a larger bandwidth.".

In summary, the technique proposed in "*Optimal "focusing" for low resolution ScanSAR*" does not introduce additional phase noise, but, unlike the present invention, neither does it provide any solution for compensating the phase distortion of interferometric acquisitions carried out using different azimuth acquisition directions (i.e. using different squint angles).

As additional proof of what has just been explained, it is important to note that Table II on page 482 of "*Optimal "focusing" for low resolution ScanSAR*" lists the values of the single set of parameters used for ScanSAR focusing (in which a single Doppler rate is indicated, while no Doppler centroid is indicated as it is assumed to be zero). In this way, the processing parameters (specifically, the focusing parameters) used in "*Optimal "focusing" for low resolution ScanSAR*" can change for each interferometric acquisition (in the case where the azimuth acquisition geometry changes). These focusing parameters used in "*Optimal "focusing" for low resolution ScanSAR*" correspond, in substance, to the aforementioned specific physical Doppler parameters of each acquisition that, according to the present invention, are used to calculate, for each acquisition, the aforementioned double set of processing parameters, namely:

the aforementioned focusing Doppler parameters that are the same for all the SAR acquisitions and computed on the basis of the physical Doppler parameters related to all of the SAR acquisitions; and the aforementioned respective radiometric equalization Doppler parameters that are related to said SAR acquisition and computed on the basis of the respective physical Doppler parameters related to said SAR acquisition.

Moreover, it should also be noted that neither "*Interferometric Processing of SLC Sentinel-1 TOPS Data*", nor "*Interferometric TOPS Chain Description*", nor even "*TOPS Imaging With TerraSAR-X: Mode Design and Performance Analysis*" postulate the use of double parameters for focusing and for radiometric compensation.

In summary, the Doppler shift between different interferometric acquisitions causes decorrelation. As previously explained, in order to handle this decorrelation, the traditional literature teaches the use of so-called common band filtering, but this technique causes azimuth resolution degradation, degradation that cannot be dealt with for acquisitions performed in burst mode (for example in ScanSAR mode).

Conversely, the present invention teaches to process each acquisition using two different sets of processing parameters; in particular, a same set of focusing parameters is used for focusing raw SAR data related to all the SAR acquisitions to be processed, while for each SAR acquisition, a respective radiometric equalization based on a respective set of parameters of radiometric equalization related to said SAR acquisition is also performed to compensate for possible pointing differences of the SAR sensor(s) used for carrying out the various SAR acquisitions, without degrading azimuth resolution and without introducing radiometric distortions (i.e. without introducing degradation in radiometric performance).

In other words, by resolving the problems due to the different acquisition geometry at the origin, the present invention cancels problems due to different attitude or difference in Doppler rate between the various acquisitions, thus guaranteeing spectral overlap even when physically absent and overcoming the aforementioned limitations of the currently known techniques.

It is also important to note that further technical advantages of the present invention derive from the possibility of correcting (block 442 in FIG. 14) the estimates of the physical and/or processing Doppler parameters (i.e. the focusing and radiometric equalization parameters) after focusing and radiometric equalization (block 441 in FIG. 14), for example, by analysing possible artefact remnants in the SAR images. In this way, it is possible to iteratively perform the processing (i.e. the focusing and radiometric equalization—block 441 in FIG. 14), progressively refining the estimate of the physical and/or processing Doppler parameters (i.e. the focusing and radiometric equalization parameters—block 442 in FIG. 14) and, consequently, progressively improving the quality of the final products (i.e. the generated SAR images—block 451 in FIG. 14).

Furthermore, as previously explained, after azimuth co-registration of the SAR images, according to the present invention it is also possible to estimate possible burst position errors (due, for example, to errors in the estimates of the nominal positions of the SAR sensors) and, if necessary, correct the reference spatial/temporal positions of the bursts (blocks 452 and 432 in FIG. 14), and then use them for performing new focusing and radiometric equalization (block 441).

In conclusion, it is clear that various modifications can be applied to the present invention without departing from the scope of the invention as defined in the appended claims.

The invention claimed is:

1. A SAR imaging method (40) for interferometric analyses, comprising:
   receiving raw SAR data related to two or more SAR acquisitions of one and the same area of the earth's surface carried out by means of one or more synthetic aperture radars, wherein a maximum squint angle difference between or among the two or more SAR acquisitions is smaller than antenna's azimuth angular aperture of the one or more synthetic aperture radars;
   estimating, for each SAR acquisition, respective physical Doppler parameters indicative of pointing of the one or more synthetic aperture radars used to carry out said SAR acquisition; and
   processing the raw SAR data so as to generate SAR images;
   characterized in that, for each SAR acquisition, the respective raw SAR data related to said SAR acquisition are processed on the basis of two different sets of processing parameters, which include:
      a first set that is the same for all the SAR acquisitions and which comprises focusing Doppler parameters computed on the basis of the physical Doppler parameters estimated for all the SAR acquisitions; and
      a respective second set, which comprises respective radiometric equalization Doppler parameters related to said SAR acquisition and computed on the basis of the respective physical Doppler parameters estimated for said SAR acquisition;
   and wherein processing includes:
      focusing the raw SAR data related to all the SAR acquisitions on the basis of said focusing Doppler parameters; and,
      for each SAR acquisition, applying a respective radiometric equalization, based on the respective radiometric equalization Doppler parameters, to the respective SAR data to compensate for possible differences in pointing of the one or more synthetic aperture radars used to carry out the SAR acquisitions, without degrading azimuth resolution and without introducing radiometric distortions.

2. The method of claim 1, further comprising receiving, for each SAR acquisition, respective data indicative of respective spatial and temporal characteristics of said SAR acquisition and which include data indicative of the pointing and position of the one or more synthetic aperture radars used to carry out said SAR acquisition and of corresponding acquisition times; and
   wherein, for each SAR acquisition, the respective physical Doppler parameters are estimated on the basis of the respective data indicative of the respective spatial and temporal characteristics of said SAR acquisition.

3. The method of claim 2, wherein the two or more SAR acquisitions are SAR acquisitions performed in burst mode.

4. The method of claim 3, wherein the two or more SAR acquisitions are acquisitions of the ScanSAR, PingPong or TOPS type.

5. The method according to claim 3, further comprising:
   for each SAR acquisition, determining a position of each respective burst on the basis of the respective data indicative of the respective spatial and temporal characteristics of said SAR acquisition; and
   determining reference positions of the bursts on the basis of the positions of the bursts of each SAR acquisition;
   wherein the raw SAR data are also processed on the basis of the reference positions of the bursts.

6. The method of claim 5, further comprising:
   co-registering the generated SAR images;
   detecting and estimating burst position errors on the basis of the co-registered SAR images;
   correcting the reference positions of the bursts on the basis of the estimated burst position errors; and
   processing the raw SAW data again on the basis of the corrected reference positions of the bursts.

7. The method according to claim 1, wherein:
   for each SAR acquisition, the respective physical Doppler parameters include a respective physical Doppler centroid and/or a respective physical Doppler rate indicative of the pointing of the one or more synthetic aperture radars used to carry out said SAR acquisition;
   for each SAR acquisition, the respective radiometric equalization Doppler parameters include a respective radiometric equalization Doppler centroid and/or a respective radiometric equalization Doppler rate computed on the basis of the respective physical Doppler centroid and/or the respective physical Doppler rate; and
   the focusing Doppler parameters include a focusing Doppler centroid and/or a focusing Doppler rate computed on the basis of the physical Doppler centroids and/or the physical Doppler rates related to the two or more SAR acquisitions.

8. The method according to claim 1, further comprising:
   detecting and estimating errors in the radiometric equalization Doppler parameters and/or the focusing Doppler parameters on the basis of the generated SAR images;
   updating the radiometric equalization Doppler parameters and/or the focusing Doppler parameters on the basis of the estimated errors; and
   processing the raw SAR data again on the basis of the updated radiometric equalization Doppler parameters and/or focusing Doppler parameters.

9. Electronic processing means configured to perform the SAR imaging method (40) as claimed in claim 1.

10. A non-transitory computer-readable medium comprising software code portions that are executable by electronic processing means and such that to cause, when executed, said electronic processing means to implement the SAR imaging method (40) as claimed in claim 1.

* * * * *